United States Patent [19]
Yoneyama et al.

[11] Patent Number: 5,806,484
[45] Date of Patent: Sep. 15, 1998

[54] INDUCTION CONTROL SYSTEM FOR ENGINE

[75] Inventors: Mamoru Yoneyama; Masato Nishigaki, both of Iwata, Japan

[73] Assignee: Yamaha Hatsudoki Kabushiki Kaisha, Iwata, Japan

[21] Appl. No.: 521,926

[22] Filed: Aug. 31, 1995

[30] Foreign Application Priority Data

Aug. 31, 1994 [JP] Japan .................................. 6-207086

[51] Int. Cl.$^6$ .............................. F02M 35/10; F02D 9/08
[52] U.S. Cl. .......................................... 123/308; 123/337
[58] Field of Search .................................. 123/308, 337, 123/432

[56] References Cited

U.S. PATENT DOCUMENTS

| 1,727,265 | 3/1929 | Aseltine | 123/184.39 |
|---|---|---|---|
| 3,318,292 | 5/1967 | Hideg | 123/308 |
| 3,408,992 | 11/1968 | Seggern et al. | 123/277 |

(List continued on next page.)

FOREIGN PATENT DOCUMENTS

| 0054964 | 6/1982 | European Pat. Off. . | |
|---|---|---|---|
| 0068481 | 1/1983 | European Pat. Off. . | |
| 0074202 | 3/1983 | European Pat. Off. . | |
| 0076632 | 4/1983 | European Pat. Off. . | |
| 0221312 | 5/1987 | European Pat. Off. . | |
| 0235288 | 9/1987 | European Pat. Off. . | |
| 449240 | 10/1991 | European Pat. Off. . | |
| 2569227 | 8/1986 | France . | |
| 2709519 | 9/1977 | Germany . | |
| 3429414 | 2/1985 | Germany . | |
| 3638021 | 5/1987 | Germany . | |
| 0054007 | 12/1976 | Japan . | |
| 19009 | 2/1979 | Japan | 123/337 |
| 0043428 | 4/1981 | Japan . | |
| 00139829 | 10/1981 | Japan . | |
| 0005767 | 2/1984 | Japan . | |
| 00120718 | 7/1984 | Japan . | |
| 0011206 | 3/1985 | Japan . | |
| 0012940 | 1/1986 | Japan . | |
| 0028715 | 2/1986 | Japan . | |
| 00144223 | 9/1986 | Japan . | |
| 0032122 | 2/1988 | Japan . | |
| 0073532 | 2/1988 | Japan . | |
| 0073534 | 5/1988 | Japan . | |
| 266122 | 11/1988 | Japan | 123/337 |
| 0115922 | 9/1990 | Japan . | |
| 0230920 | 9/1990 | Japan . | |
| 60523 | 2/1948 | Netherlands . | |
| 652671 | 5/1951 | United Kingdom . | |
| 1135482 | 12/1968 | United Kingdom . | |

(List continued on next page.)

OTHER PUBLICATIONS

European Search Report dated Oct. 5, 1992 w/ Patent Abstract.
European Search Report dated Nov. 23, 1992 w/Patent Abstract.

*Primary Examiner*—Willis Wolfe, Jr.
*Attorney, Agent, or Firm*—Knobbe, Martens, Olson & Bear LLP

[57] ABSTRACT

An induction system for a multi-valve internal combustion engine including a control valve arrangement for redirecting the flow into the combustion chamber through a relatively small displaced bypass passageway under certain running conditions so as to provide a high velocity flow into the combustion chamber even though the total air flow is small. The flow is also directed so as to generate a slant-type tumble motion in the combustion chamber to further increase the turbulence and improve combustion under the running conditions when the control valve is in its flow restricting flow redirecting position. The bypass passage has a relatively regular configuration with a low peripheral length to cross-sectional area ratio so as to provide a compact overall assembly and to facilitate manufacturing. In the open position, the control valve offers substantially no restriction to air flow so that high power outputs can be achieved while still maintaining good running under low-speed, low-load conditions.

12 Claims, 5 Drawing Sheets

U.S. PATENT DOCUMENTS

| | | | |
|---|---|---|---|
| 4,105,577 | 8/1978 | Yamashita | 252/300 |
| 4,174,686 | 11/1979 | Shimizu et al. | 123/308 |
| 4,228,772 | 10/1980 | Bakonyi | 123/403 |
| 4,240,387 | 12/1980 | Motosugi et al. | 123/184.45 |
| 4,256,062 | 3/1981 | Schafer | 123/308 |
| 4,269,153 | 5/1981 | Kunii et al. | 123/308 |
| 4,286,561 | 9/1981 | Tsutsumi | 123/432 |
| 4,308,830 | 1/1982 | Yamada et al. | 123/188.14 |
| 4,308,837 | 1/1982 | Nohira et al. | 123/337 |
| 4,317,438 | 3/1982 | Yagi et al. | 123/432 |
| 4,320,725 | 3/1982 | Rychlik et al. | 123/188.14 |
| 4,354,463 | 10/1982 | Otani et al. | 123/308 |
| 4,356,801 | 11/1982 | Graham | 123/337 |
| 4,413,598 | 11/1983 | Tsutsumi | 123/306 |
| 4,428,334 | 1/1984 | Klomp | 123/188.14 |
| 4,452,218 | 6/1984 | Yokoyama et al. | 123/579 |
| 4,499,868 | 2/1985 | Kanda et al. | 123/188.14 |
| 4,543,931 | 10/1985 | Hitomi et al. | 123/308 |
| 4,663,938 | 5/1987 | Colgate | 60/620 |
| 4,669,434 | 6/1987 | Okumura et al. | 123/308 |
| 4,700,669 | 10/1987 | Sakurai et al. | 123/188.14 |
| 4,704,996 | 11/1987 | Morikawa | 123/308 |
| 4,714,063 | 12/1987 | Oda et al. | 123/308 |
| 4,719,886 | 1/1988 | Kotani et al. | 123/308 |
| 4,753,200 | 6/1988 | Kawamura et al. | 123/188.14 |
| 4,762,102 | 8/1988 | Kanda | 123/188.14 |
| 4,779,594 | 10/1988 | Oda et al. | 123/432 |
| 4,827,883 | 5/1989 | Khalighi et al. | 123/308 |
| 4,834,035 | 5/1989 | Shimada et al. | 123/188.14 |
| 4,930,468 | 6/1990 | Stockhausen | 123/188.14 |
| 4,974,566 | 12/1990 | LoRusso et al. | 123/308 |
| 4,995,359 | 2/1991 | Yokoyama et al. | 123/188.14 |
| 4,998,518 | 3/1991 | Mitsumoto | 123/306 |
| 5,018,497 | 5/1991 | Tsuchida | 123/432 |
| 5,060,616 | 10/1991 | Nakagawa et al. | 123/432 |
| 5,167,211 | 12/1992 | Fukuma et al. | 123/337 |
| 5,311,849 | 5/1994 | Lambert et al. | 123/337 |

FOREIGN PATENT DOCUMENTS

| | | |
|---|---|---|
| 1293772 | 10/1972 | United Kingdom . |
| 1457152 | 12/1976 | United Kingdom . |
| 2016081 | 9/1979 | United Kingdom . |
| 2027796 | 2/1980 | United Kingdom . |
| 2064646 | 6/1981 | United Kingdom . |
| 2079763 | 1/1982 | United Kingdom . |
| 2087480 | 5/1982 | United Kingdom . |
| 2107780 | 5/1983 | United Kingdom . |
| 2196386 | 4/1988 | United Kingdom . |
| 2196388 | 4/1988 | United Kingdom . |
| 2242226 | 9/1991 | United Kingdom . |
| 7900501 | 8/1979 | WIPO . |
| 9114858 | 10/1991 | WIPO . |

INDUCTION CONTROL SYSTEM FOR ENGINE

BACKGROUND OF THE INVENTION

This invention relates to an induction system for an internal combustion engine and more particularly to a control arrangement for controlling the effective size and operation of an engine induction system.

In order to improve the performance of an engine induction system at low and mid-range speeds without adversely affecting the ability of the engine to provide maximum power output, a variety of mechanisms and structures have been proposed for altering the configuration of the induction passage in response to the engine running characteristics. That is, these systems generally serve a function of either reducing the effective cross-sectional area of the induction system at low speeds and low loads and/or redirecting the flow into the combustion chamber through the intake ports under the same running conditions. Various structures have been proposed for this purpose.

By reducing the effective cross-sectional area of the induction passage under these running conditions, it is possible to increase the flow velocity into the combustion chamber. High flow velocities are desirable at low engine speeds because they help promote rapid flame propagation during this difficult combustion condition. In addition, redirecting the flow into the combustion chamber has the effect of permitting the generation of turbulence in the combustion chamber which has the same net positive effect. By changing the effective configuration of the induction system, it is possible to achieve these effects without adversely affecting performance at the high end and the high load conditions.

As has been noted, various structures and mechanisms have been proposed for this purpose. One way in which this can be done is by suitably configuring the induction passage and then providing one or more control valves that cooperate with the induction passage so as to alter its configuration. However, if the control valve is configured so as to provide a substantial reduction in cross-sectional area and a substantial difference in the configuration of the resulting restricted passage from the main passage, then the valve structure becomes quite bulky. This has two distinct disadvantages. First, as the valve structure becomes larger, then it is difficult to accommodate it in the actual physical structure of the engine. This is particularly true if the engine is of the overhead valve type. In addition, the use of such valves will at times result in a structure which is still obstructs the induction passage under high speed, high load conditions, and thus performance under these conditions may deteriorate.

It is, therefore, a principal object of this invention to provide an improved induction control system for an engine.

It is a further object of this invention to provide an improved induction control system for an engine wherein the configuration and size of the intake passage can be changed significantly through the use of a relatively simple and unobtrusive valve structure.

It is a further object of this invention to provide an improved induction control system for an engine utilizing a relatively simple type of control valve and yet which permits significant differences in the configuration and size of the intake passage when the valve is in its flow-restricting and/or redirecting position.

SUMMARY OF THE INVENTION

An internal combustion engine constructed in accordance with this invention embodies an induction control system which serves a combustion chamber of the engine. The induction control system includes an induction passage that extends from an atmospheric air inlet and which terminates in the combustion chamber through at least intake port. The induction passage has a portion adjacent and upstream of the intake port of a predetermined cross-sectional configuration. A control valve is disposed in the induction passage portion and is movable between a first position wherein the cross-sectional configuration and area of the induction passage is substantially unrestricted. The control valve is also movable to a second position wherein the predetermined cross-sectional configuration of the induction passage is substantially closed except for a relatively small area defined along one peripheral edge of the control valve of a cross-sectional area substantially less than one-third of the predetermined cross-sectional configuration. This small area is disposed in a confined area to the peripheral edge of the control valve and which flow area is substantially regular so as to provide a flow area that has a relatively short peripheral length.

DETAILED DESCRIPTION OF THE PREFERRED EMBODIMENTS OF THE INVENTION

Figure 1:
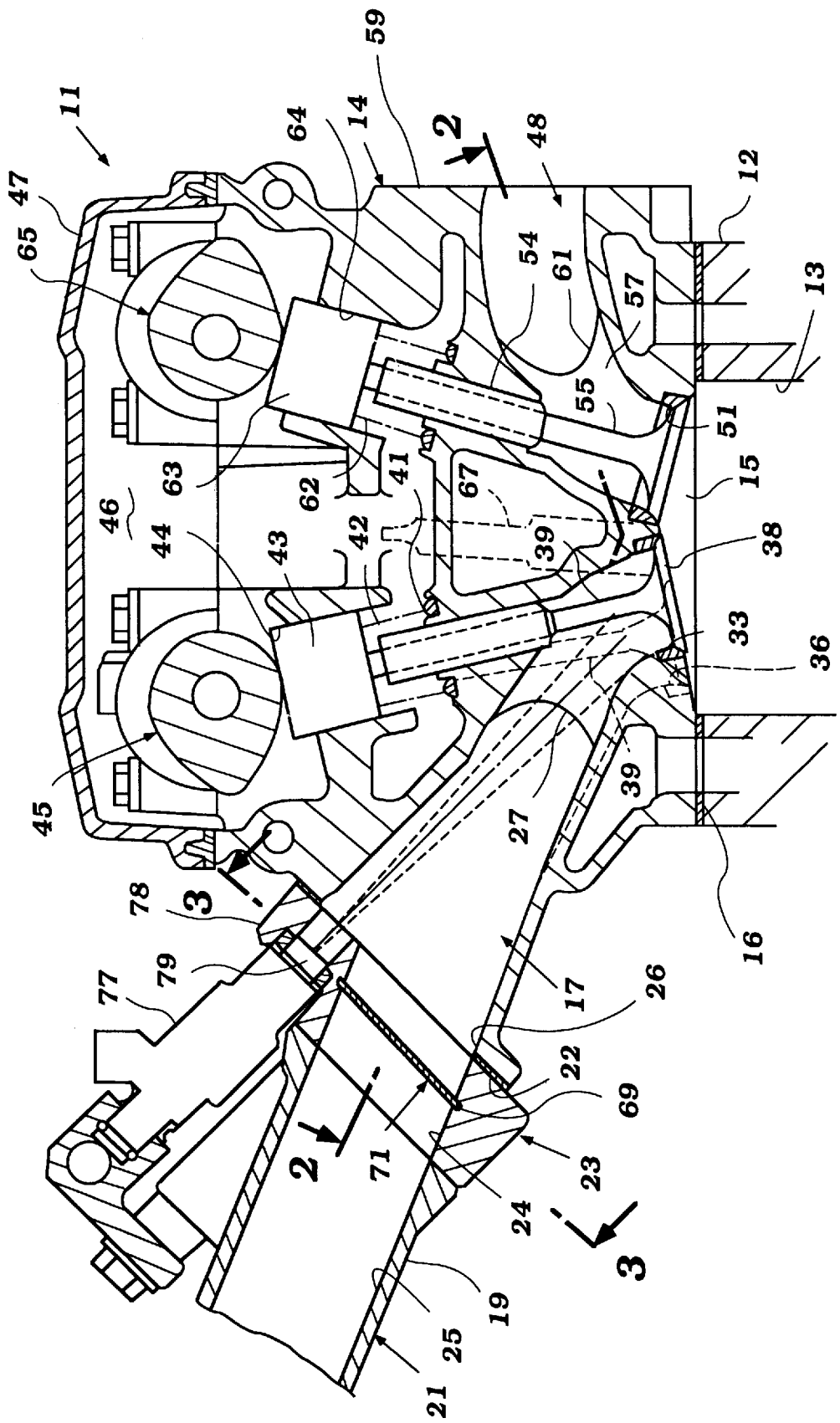
FIG. 1 is a partial cross-sectional view taken through a portion of an internal combustion engine constructed in accordance with an embodiment of the invention taken along the line 1—1 of FIG. 2.

Referring now in detail to the drawings and initially to FIG. 1, an internal combustion engine constructed in accordance with a first embodiment of the invention is shown partially and is identified generally by the reference numeral 11. The invention deals primarily with the induction system for the engine 11 and thus only the cylinder head and upper portion of the cylinder block are depicted. In addition, only the construction associated with a single cylinder of the engine is depicted in this figure, although certain of the remaining figures show a slide valve assembly for use with an engine having either four in-line cylinders or one bank of a V-8 engine. It will be readily apparent to those skilled in the art from the following description how the invention can be practiced with multiple cylinder engines in addition to single cylinder engines and engines having varying configurations.

The engine 11 is provided with a cylinder block 12 having one or more cylinder bores 13 and which pistons (not shown) reciprocate. These pistons are connected to a crankshaft by connecting rods in a known manner and for that reason and those already noted, this construction is not illustrated.

A cylinder head assembly, indicated generally by the reference numeral 14, is affixed to the cylinder block 12 in a known manner. The cylinder head assembly 14 has recesses 15 formed in a lower surface 16 thereof which overlie the cylinder bores 13 and form with them and the pistons the combustion chamber of the engine. At times, the recesses 15 will be referred to as the combustion chambers. At top dead center, the recesses 15 comprise the substantial volume of the combustion chamber.

The cylinder head 14 is depicted as being of the overhead valve twin overhead cam type. Accordingly, an induction passage arrangement 17 is formed on one side of a plane A (FIG. 2) that contains the cylinder bore axis 18. This induction passage 17 is served by a runner 19 of an intake manifold, shown only partially and indicated generally by the reference numeral 21. The intake manifold is provided with any known type of throttle valve arrangement for controlling the engine speed.

Interposed between the manifold runner 19 and an outer surface 22 of the cylinder head assembly 14 is provided a control valve block 23. The control valve block and its function will be described later. However, the control valve block 23 forms an induction passage section 24 which is complementary to the discharge end 25 of the intake manifold runner 19 so as to provide a smooth and continuous flow path therethrough. The downstream side of the passage section 24 is flared out slightly so as to be complementary to an inlet opening 25 formed in the cylinder head surface 22 and which forms the opening to the induction passage 17.

Figure 2:
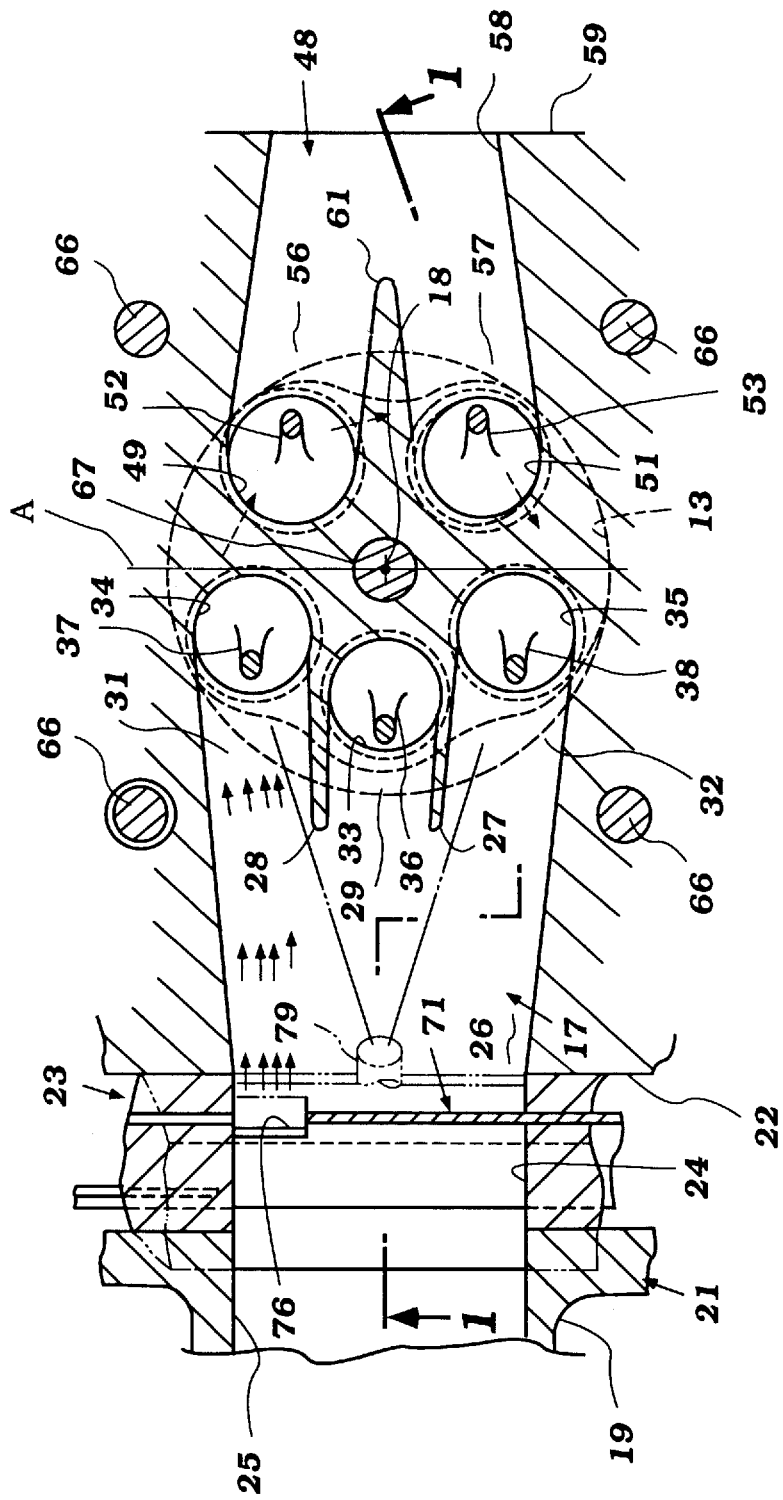
FIG. 2 is a cross-sectional view taken along the line 2—2 of FIG. 1 and generally shows the configuration of the induction and exhaust passages of the engine.

The induction passage 27 is of the Siamese type and extends from the common inlet opening 25 to three branch passage sections that are defined by interior dividing walls 27 and 28. These passage portions comprise a center intake passage portion 29, a first side intake passage portion 31, and a second side intake passage portion 32. These intake passage portions 29, 31 and 32 terminate at respective valve seats 33, 34 and 35 which are configured as best seen in FIG. 2. The side valve seats 34 and 35 lie adjacent to and partially overlap the plane A on the intake side of the cylinder head. The center intake valve seat 33 is spaced further from this plane and closer to the periphery of the cylinder bore axis 13.

The opening and closing of the valve seats 33, 34 and 35 is controlled by respective poppet-type valves 36, 37 and 38. Each of the valves 36, 37 and 38 has a respective valve stem 39 that is slidably supported in a valve guide 41 that is pressed or otherwise fixed into the cylinder head assembly. The valves 36, 37 and 38 are urged to their closed positions by means of coil compression springs 42 that are loaded between machined surfaces formed on the cylinder head assembly 14 and keeper retainer assemblies that are fixed to the upper ends of the valve stems 39 in a known manner. These keeper retainer assemblies are concealed within thimble tappets 43 that are slidably supported in bores 44 formed in the cylinder head assembly 14 for operating the valves 36, 37 and 38 in a well known manner.

Although a wide variety of valve orientations and configurations may be employed, preferably the side intake valves 37 and 38 have their reciprocal axes lying in a common plane that is disposed at an acute angle to the plane A. The center intake valve 36 also reciprocates about a reciprocal axis that is disposed at an acute angle to this plane. However, the acute angle about which this axis is disposed is less than the acute angle associated with the side intake valves 37 and 38. This configuration provides a compact combustion configuration while permitting the use of high compression ratios.

An intake camshaft 45 is rotatably journaled in the cylinder head assembly 14 in a known manner within a cam chamber 46 that is closed by a cam cover 47. The cam cover 47 is affixed to the cylinder head assembly 14 in any well known manner. The intake shaft 45 is driven at one-half crankshaft speed. Since the invention deals primarily with the induction passage 17 and the flow control therefor, further details of the valve operating mechanism is not believed to be necessary to permit those skilled in the art to practice the invention.

On the side of the cylinder head assembly 14 opposite to the induction passage 17, there is provided an exhaust passage 48. This exhaust passage 48 extends from a pair of exhaust valve seats 49 and 51 which are formed by respective valve seat inserts that are pressed or cast into the cylinder head assembly 14 in a known manner. A pair of exhaust valves 52 and 53 are slidably supported in the cylinder head assembly 14 by means of valve guides 54 that cooperate with their stem portions 55 in a manner similar to that of the intake valves thus far described.

From the valve seats 49 and 51, the exhaust passage 48 is formed with branch portions 56 and 57 that lead to a common discharge opening 58 formed in an outer surface 59 of the cylinder head assembly 14. The branch portions 56 and 57 are separated from each other by a dividing wall 61. A suitable exhaust manifold (not shown) is affixed to the cylinder head surface 58 for collecting the exhaust gases and discharging them to the atmosphere.

Like the intake valves 36, 37 and 38, coil compression springs 62 encircle the stem portions 55 of the exhaust valves 52 and 53. These springs engage machined surfaces on the cylinder head assembly 14 and keeper retainer assemblies (not shown) that are concealed within thimble tappets 63. The thimble tappets 63 are, in turn, slidably supported in bores 64 machined in the cylinder head assembly 14.

An exhaust camshaft 65 is rotatably journaled in the cylinder head assembly 14 within the cam chamber 46. The exhaust camshaft 65 has lobes that engage and operate the tappets 63. The exhaust valves 52 and 53 are thus operated in a manner well known in this art. The rotational axis of the intake and exhaust camshafts 45 and 65 are parallel to each other and these camshafts are driven at one-half crankshaft speed by any known mechanism.

The cylinder head assembly 14 is affixed, as aforenoted, to the cylinder block 12 in a known manner. Threaded fasteners 66 (FIG. 2) are positioned at equal distances from the cylinder bore axis 18 for this purpose.

Spark plugs 67 are mounted in the cylinder head assembly 14 so that their spark gaps are exposed substantially on the cylinder bore axes 18. The spark plugs 67 are fired by a suitable ignition system.

The construction of the engine as thus far described may be considered to be conventional. For that reason, many of the components have been described only summarily because, except for the configuration of the induction passages 17 and the valve block 23 and the valve mechanism contained therein, the invention may be employed with any type of conventional or known engine.

Basically, the configuration of the induction passage 17 is such that the charge which it delivers to the engine through the intake valve seats 33, 34 and 35 will be substantially unrestricted and permit high power outputs. The side intake passages 31 and 32 may be configured so as to generate some slight clockwise tumble to the intake charge under high speed, high load conditions due to the placement of the valve seats 34 and 35 close to or overlying the plane A. However, this tumble is relatively slight and thus when the induction system operates at low speed and low loads, there is little turbulence and velocity to the intake charge.

Therefore, the control valve block 21 is provided so as to increase the flow velocity and redirect it to generate turbulence under this critical engine running condition.

As has been noted, the control valve block 21 has induction passage portions 24 which are complementary in configuration to the discharge end 23 of the manifold runners 19 and the inlet opening 26 of the cylinder head. As may be best seen in FIGS. 3 and 4, these openings are generally oval in configuration. This provides a relatively large cross-sectional flow area for the peripheral length of the intake passages 24. This permits a compact engine construction and, at the same time, a large effective flow area.

Figure 3:
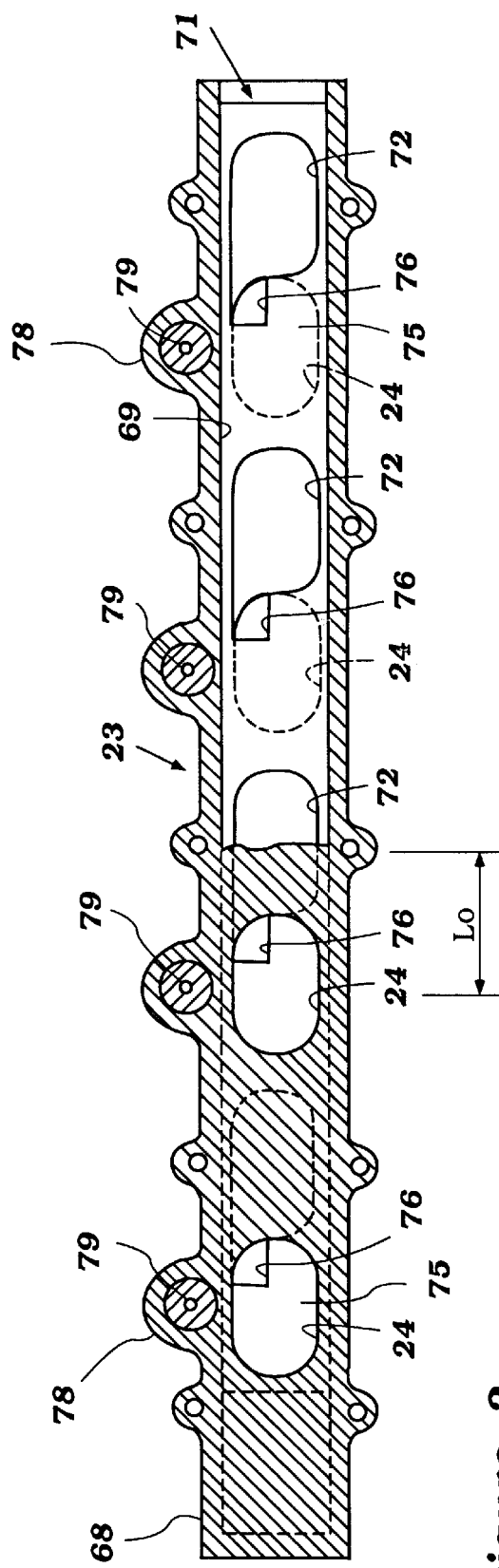
FIG. 3 is a cross-sectional view taken along the line 3—3 of FIG. 1 and shows the control valve in its low speed, low load condition.
Figure 4:
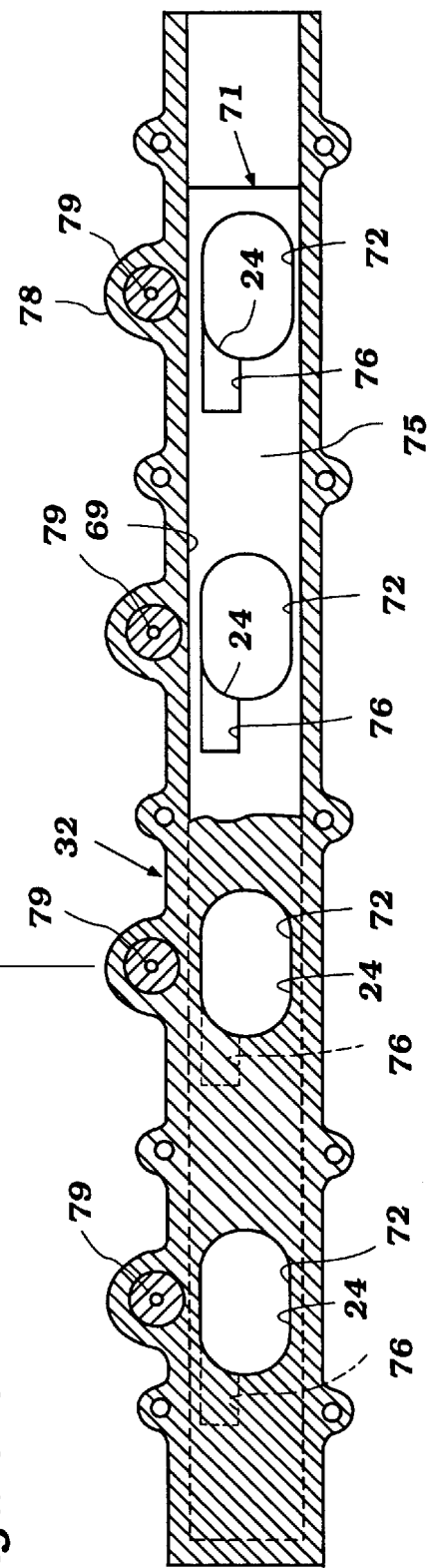
FIG. 4 is a cross-sectional view, in part similar to FIG. 3, and shows the control valve in its high speed, high load condition.

The valve block 23 is comprised of an outer housing 68 having a slotted opening 69 in which a slide valve plate 71 is slidably supported. The slide valve plate 71 is connected in an appropriate manner to an appropriate servomotor or the like so that it can be reciprocated from a fully opened, unrestricted flow portion as shown in FIG. 4 to a flow restricting and redirecting position as shown in FIG. 3. To this end, the control valve plate 71 is formed with a plurality of openings which are comprised of first, generally oval-shaped portions 72 which are complementary in shape to the valve body openings 24 so when in the position shown in FIG. 4 there is an unrestricted flow through the valve assembly. These openings 72 are formed in a plate-like portion 75 of the slide valve 71.

Figure 5:
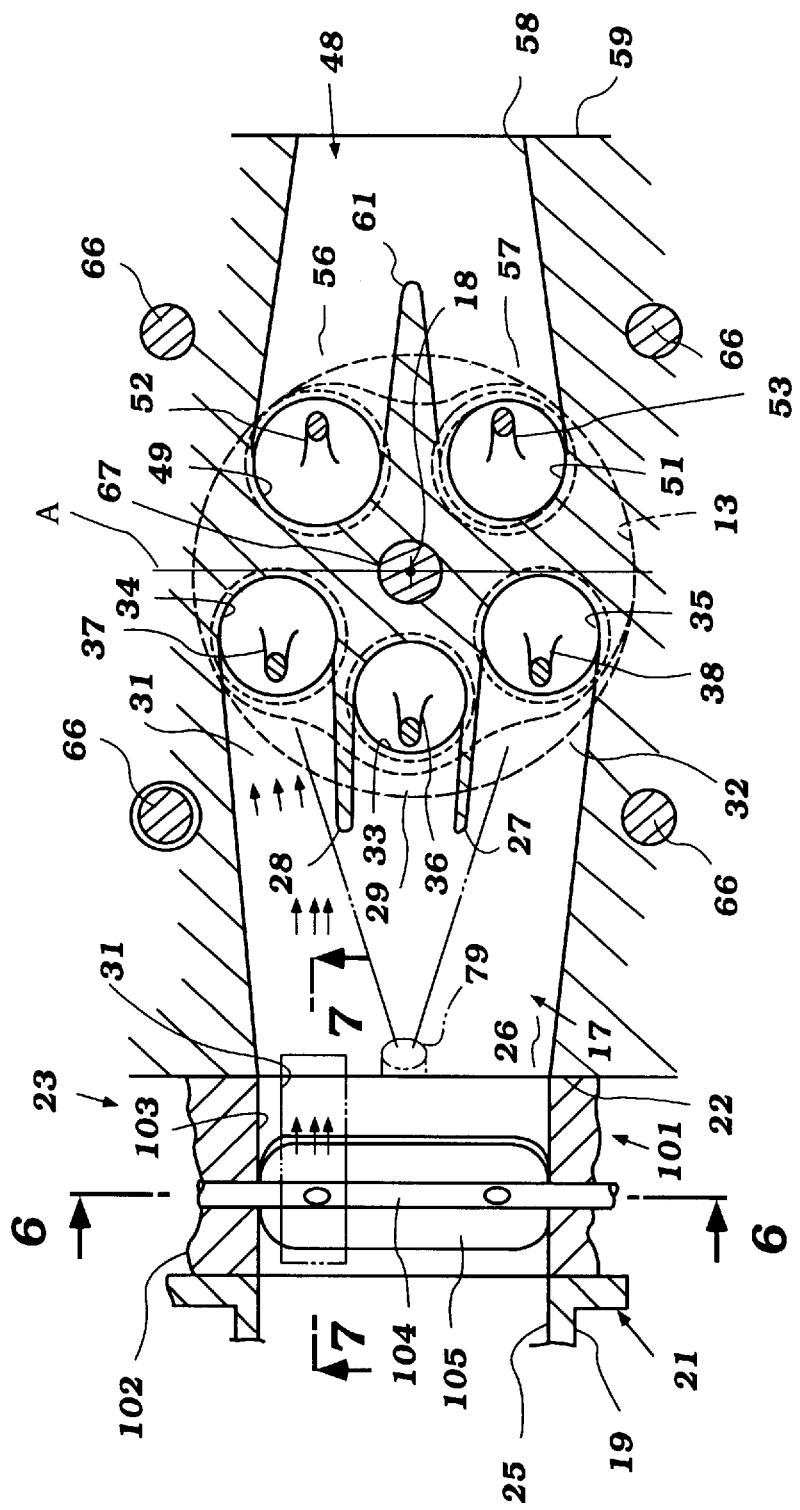
FIG. 5 is a cross-sectional view, in part similar to FIG. 2, and shows a second embodiment of the invention.

In accordance with the invention, a rectangularly-shaped notched opening 76 is formed at an upper peripheral edge of each opening 72 and is disposed so that when the valve slides an actuating distance $L_o$ between its fully opened position as shown in FIG. 4 to its closed flow restricting portion as shown in FIG. 5, only the openings 76 will mate with the valve body openings 24. Hence, a very small restricted flow area is provided that is disposed, as best seen in FIG. 2, toward one side of, and the upper peripheral edge of, the side intake passage portion 31. Hence, when the control valve element 71 is in this position, the air flow will all channel through the opening 76 toward one side of the valve seat 74 viewed in the direction of the plane A and toward the side of the valve seat 34 disposed closest to the plane A. The size and shape of the openings 76 is generally regular so as to define a large but confined flow path. When the term "regular" is used to describe the shape of the flow path, it means an opening that have a relatively small perimeter in relation to its flow area.

Hence, this will impart a swirl action to the intake charge as well as a tumble action. This motion is referred to at times as slant/tumble action. Thus, there will be substantial turbulence generated in the combustion chamber under the conditions when the control valve element 71 is in this position so as to significantly improve the combustion in the combustion chamber under this difficult engine running condition.

Any type of control strategy can be employed but basically the control valve element 71 is maintained in the position shown in FIG. 3 at low speed, low load, and is moved to the position shown in FIG. 4 as the speed and load on the engine increases.

A fuel injector of the electronic type, indicated generally by the reference numeral 77, is mounted in a flange portion 78 of the valve body 68 so that its discharge nozzle opening 79 can spray into the intake passage 17 in a generally centrally disposed relationship as shown in FIG. 2. This positioning spans the entire area of the valve seats 33, 34 and 35 and thus will provide good mixture distribution under high speed, high load conditions.

When operating at low speed, low load conditions and when the control valve element 71 is in the position shown in FIGS. 2 and 3, substantially all of the air flow will enter through the valve seat 34 and this air flow will tend to cause the fuel spray to be directed primarily through this valve seat.

Figure 6:
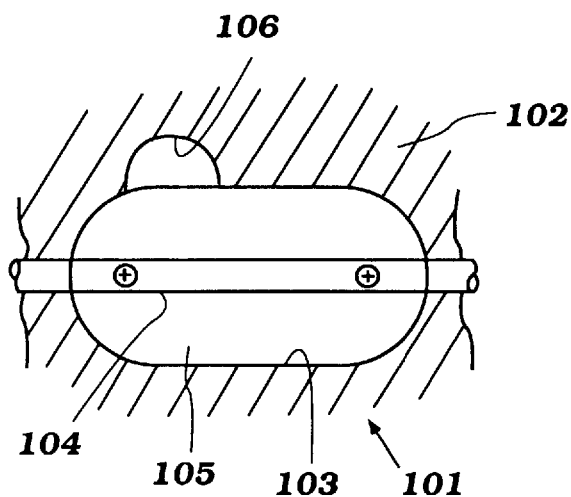
FIG. 6 is a cross-sectional view taken along the line 6—6 of FIG. 5 and shows the control valve in its low speed, low load condition.
Figure 7:
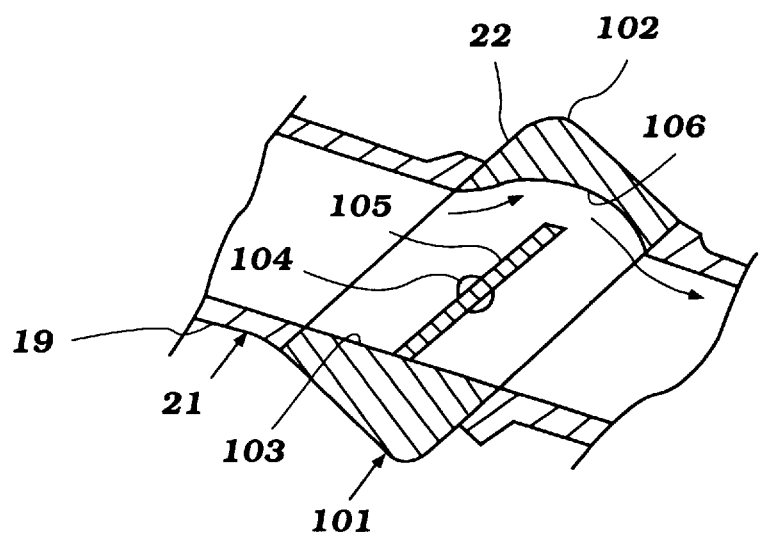
FIG. 7 is a cross-sectional view taking along the line 7—7 of FIG. 5 and again shows the control valve in its low speed, low load condition.

FIGS. 5–7 show another embodiment of the invention. In this embodiment, the basic engine is the same as the embodiment of FIGS. 1–4 and, therefore, the same reference numerals have been utilized to identify the same components. Also because of this difference, a figure corresponding to FIG. 1 is not necessary to understand the construction and operation of this embodiment. This embodiment differs from the previously described embodiment primarily in the construction of the control valve assembly, indicated generally by the reference numeral 101, and the way in which the bypass air flow is provided when the control valve element is in its closed or flow-restricting, flow-redirecting position.

In this embodiment, the control valve 101 includes a valve body 102 which is, like the previously described embodiment, received between the runners 19 of the intake manifold 21 and the cylinder head surface 22. In addition and similar to the previously described embodiment, the valve body 102 provides a plurality of flow openings 103 which are, except as will be noted, complementary in configuration to the manifold runner outlet portions 25 and the cylinder head inlet portion 26. Thus, the openings 103 have a generally oval configuration, except as will be hereinafter noted.

A control valve shaft 104 is rotatably journaled within the valve body 102 and extending through generally the center of each of the flow passages 103. A butterfly-type valve plate 105 is affixed to the control valve shaft 104 in each flow opening 103. The configuration of each valve plate 105 is generally complementary to the flow opening 103 so that when the control valve 105 is in its closed or flow-redirecting position, as shown in each figure, the passageway 103 will be substantially closed.

In order to provide the restricted flow area path, each passage 103 is provided with a relief 106 that is disposed at the upper peripheral edge thereof and close to the side of the opening so that the flow will be directed, as with the previously described embodiment, primarily toward the outer edge of the side intake valve seat 34 and also on the side of this insert closest to the plane containing the axis of the cylinder bore, which point is not illustrated in these figures. Hence, a swirl/tumble action will be generated as with the previously described embodiment, when the control valve elements 105 are in their flow restricting and flow controlling position.

As with the previously described embodiment, the area of the bypass passage 106 is substantially smaller than that of the main portion of the passage 103 and substantially less than one-third of its cross-sectional area. In addition, the passage 106 has a generally regular configuration. Thus its perimeter-to-area ratio is relatively small, as with the previously described embodiment. Hence, a relatively large flow area is provided in a very small area of the total intake passage so as to provide a substantial flow redirection and a substantial increase in velocity.

As with the previously-described embodiment, any type of control routine may be employed for controlling the position of the control valves 105. In a preferred form, the control valves 105 are closed under low-speed, low-load conditions and are moved to their fully opened position under high-speed, high-load conditions.

In the fully opened position, the control valve shaft 104 will obstruct part of the flow passage 103 but the obstruction will be relatively small and hence charging efficiency will be high and maximum power outputs can be obtained.

Thus, from the foregoing description, it should be readily apparent that the described embodiments provide very compact constructions and yet provide very effective flow redirection and velocity increase when desired. In addition, this increased velocity and flow direction can be confined to a relatively narrow area of the total intake passage so as to promote the desired type of motion in the combustion chamber when the control valves are closed.

Of course, the foregoing description is that of preferred embodiments of the invention and various changes and modifications may be made without departing from the spirit and scope of the invention, as defined by the appended claims.

We claim:

1. An internal combustion engine induction control system, said engine having means defining a combustion chamber including at least in part a cylinder bore, an induction passage extending from an atmospheric air inlet and terminating in said combustion chamber through at least one intake port, said intake port having a first edge disposed adjacent a plane containing the axis of said cylinder bore and a diametrically opposite second edge disposed adjacent said cylinder bore, said induction passage having a portion adjacent and upstream of said intake port of a predetermined cross-sectional configuration, and a control valve disposed in said induction passage portion and movable between a first position wherein said predetermined cross-sectional configuration is substantially unrestricted and a second position wherein said predetermined cross-sectional configuration is substantially closed except for a relatively small area bypass passage defined along one peripheral edge of said control valve of a cross-sectional area substantially less than one-third of said predetermined cross-sectional configuration and disposed in a confined area to the peripheral edge of said control valve, said flow area being formed primarily by a recess formed in the portion of said engine defining said flow passage and being of a regular shape having a relatively small peripheral-to-cross-sectional area ratio said recess being formed in said engine portion on the side of said induction passage terminating at said first edge of said intake port for generating a tumble action in said combustion chamber when said control valve is in said second position.

2. An internal combustion engine as set forth in claim 1, wherein the bypass passage is formed solely within the engine portion.

3. An internal combustion engine as set forth in claim 1, wherein the control valve comprises a rotary-type valve.

4. An internal combustion engine as set forth in claim 3, wherein the rotary-type valve comprises a butterfly-type valve supported on a control valve shaft that passes substantially through the center of the induction passage portion.

5. An internal combustion engine having means defining a combustion chamber, an induction passage extending from an atmospheric air inlet and terminating in said combustion chamber through a plurality of intake seats, said induction passage having a portion adjacent and upstream of said intake seats of a predetermined cross-sectional configuration, and a control valve disposed in said induction passage portion and movable between a first position wherein said predetermined cross-sectional configuration is substantially unrestricted and a second position wherein said predetermined cross-sectional configuration is substantially closed except for a relatively small area bypass passage defined along one peripheral edge of said control valve of a cross-sectional area substantially less than one-third of said predetermined cross-sectional configuration and disposed in a confined area to the peripheral edge of said control valve and which flow area is of a rectangular shape having a relatively small peripheral-to-cross-sectional area ratio said bypass passage being configured so as to direct the flow primarily to only one of said valve seats and primarily to one side of said one valve seat.

6. An internal combustion engine as set forth in claim 5, wherein the bypass passage is configured to direct the flow to one side of the one-valve seat and across the combustion chamber for also generating a tumble motion in the combustion chamber.

7. An internal combustion induction control system, said engine having means defining a combustion chamber, an induction passage extending from an atmospheric air inlet and terminating in said combustion chamber through a plurality of intake seats, said induction passage having a portion adjacent and upstream of said intake seats of a predetermined cross-sectional configuration, a control valve disposed in said induction passage portion and movable between a first position wherein said predetermined cross-sectional configuration is substantially unrestricted and a send position wherein said predetermined cross-sectional configuration is substantially closed except for a relatively small area bypass passage defined along one peripheral edge of said control valve of a cross-sectional area substantially less than one-third of said predetermined cross-sectional configuration and disposed in a confined area to the peripheral edge of said control valve and which flow area is of a regular shape having a relatively small peripheral-to-cross-sectional area ratio said bypass passage being configured so as to direct the flow primarily to only one of said valve seats, and a single fuel injector disposed at one side of said induction passage and downstream of said control valve.

8. An internal combustion engine as set forth in claim 7, wherein the one valve seat is disposed to the side of the combustion chamber so that when the control valve is closed a swirling motion is generated in the combustion chamber.

9. An internal combustion engine as set forth in claim 7, wherein there are three valve seats serving the combustion chamber.

10. An internal combustion engine as set forth in claim 9, wherein the three valve seats comprise a pair of side valve seats disposed closer to a plane containing the axis of the associated cylinder bore and the remaining valve seat comprises a center valve seat disposed between said side valve seats and further from the plane containing the cylinder bore axis and wherein the one valve seat comprises one of the side valve seats.

11. An internal combustion engine as set forth in claim 10, wherein the bypass passage is configured to direct the flow primarily to one side of the one-valve seat.

12. An internal combustion engine as set forth in claim 11, wherein the one valve seat is disposed to the side of the combustion chamber so that when the control valve is closed a swirling motion is generated in the combustion chamber.

* * * * *